(12) United States Patent
Soni

(10) Patent No.: US 7,312,693 B2
(45) Date of Patent: Dec. 25, 2007

(54) METHOD OF INCREASING BURST CAPACITY FOR AUTOMATIC METER READING

(75) Inventor: Devendra K. Soni, Maryland Heights, MO (US)

(73) Assignee: Distribution Control Systems, Inc., Hazelwood, MO (US)

( * ) Notice: Subject to any disclaimer, the term of this patent is extended or adjusted under 35 U.S.C. 154(b) by 242 days.

(21) Appl. No.: 11/186,312

(22) Filed: Jul. 21, 2005

(65) Prior Publication Data

US 2007/0018853 A1    Jan. 25, 2007

(51) Int. Cl.
*H04M 11/04* (2006.01)
(52) U.S. Cl. .......................... 340/310.01; 340/310.02; 340/310.06; 361/700
(58) Field of Classification Search ........... 340/310.01, 340/310.02, 310.06; 361/700
See application file for complete search history.

(56) References Cited

U.S. PATENT DOCUMENTS 4,559,520 A * 12/1985 Johnston ..................... 370/203
5,933,072 A * 8/1999 Kelley ......................... 375/259
2003/0142477 A1* 7/2003 Elias et al. .................. 361/700
2003/0143958 A1* 7/2003 Elias et al. ................... 455/73

* cited by examiner

*Primary Examiner*—Timothy Edwards, Jr.
(74) *Attorney, Agent, or Firm*—Polster, Lieder, Woodruff & Lucchesi, LC

(57) ABSTRACT

An automatic meter reader (AMR) used in an electrical distribution system has a communications module (26, 28) housed within an enclosure (12) for two-way message communications with a utility (U) to report information to the utility concerning electricity usage at the AMR site. The communications module includes at least one resistive element (RR) which may have an associated heat sink (H) and to which current is supplied during communications. A heat flow control (30) used with the resistive element controls the release of heat generated thereby during a message. This includes applying at least one layer (L) of a phase change material (PCM) to the resistive element, or its heat sink, to control the increase in temperature of ambient air inside the AMR enclosure during two-way communications to a temperature below a critical temperature (Tmax). This allows a message of greater length to be used for communications between the utility and AMR than was previously possible.

24 Claims, 2 Drawing Sheets

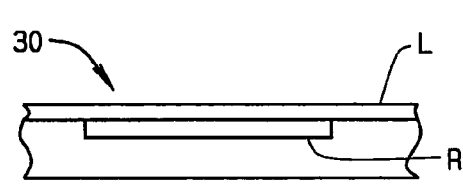
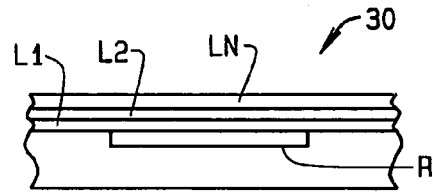
FIG. 3A  FIG. 3B
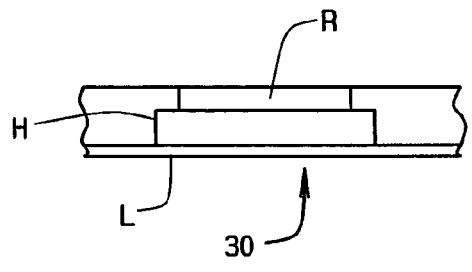
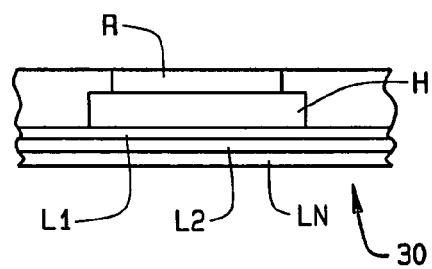
FIG. 3C  FIG. 3D
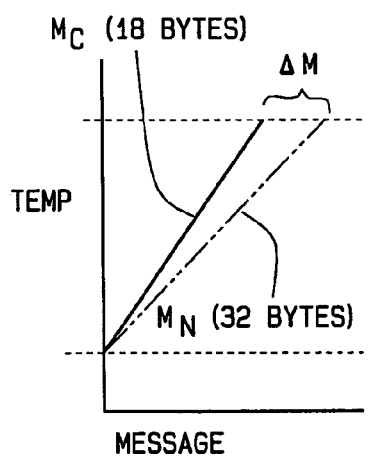
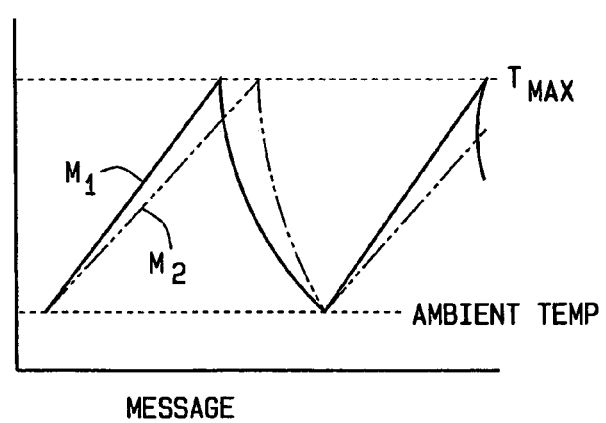
FIG. 4A  FIG. 4B

METHOD OF INCREASING BURST CAPACITY FOR AUTOMATIC METER READING

CROSS REFERENCE TO RELATED APPLICATIONS

None

STATEMENT REGARDING FEDERALLY SPONSORED RESEARCH OR DEVELOPMENT

N/A

BACKGROUND OF THE INVENTION

This invention relates to a communications system for use with meters employed by electrical utilities for automatically monitoring electrical usage; and more particularly, to an improvement which allows for better response from a meter when polled by the master station of a utility.

Automated meter reading or AMR employs specially designed electrical meters installed by a utility at each premises serviced by the utility. Use of AMR allows the utility to separately address each meter to ascertain the amount of electricity usage at the home or building, as well other information (times of peak usage, for example) so to allow the utility to better configure their distribution network to service their customers.

As currently implemented in a TWACS® system employed by the assignee of the present invention, a signal (an outbound signal) is impressed on the electrical lines leading to a facility and as the electricity passes through the meter, the signal is received and processed. The signal may, for example, request that a return signal (an inbound signal) be transmitted back from that location over the same electrical lines with information (data) as to the electrical usage at that location.

When the response signal is generated, it produces high current pulses in a fixed value resistor or other resistive element which is part of a communications module installed in the meter. As is well-known in the art, when current passes through a resistor, electrical energy is converted into heat. This heat then dissipates throughout the meter housing raising the ambient temperature of air within the enclosure and affecting other electrical components installed in the meter. The performance of electronic circuits is adversely affected by the heat, if the heat drives the component's operating temperature above the upper limit of a preferred range of temperatures. Circuit calibrations and the accuracy of information produced by a circuit are affected, and excessive component temperatures will cause the circuits to act erratically, or even fail. All of this, of course, is detrimental to operation of the meter and communications between the master station and meter site.

Recently, an issue was noticed with respect to AMRs communicated with through TWACS. The AMRs now employ a communications module designed for a 17 amp inbound signal current and a 32 byte message burst rate for a nominal 240V. circuit. In attempting to increase inbound signal strength to overcome certain field problems, it was found necessary to increase the inbound signal current from 17 to 21 amps. Since heat generated in a resistor is directly proportional to the square of the current, the increase in current resulted in a more than 50% increase in heat for an inbound signal message having the same 32 byte message length as before. Further testing demonstrated that to maintain the same heating effects as before the signal current was increased, the maximum message length had to be reduced to 18 bytes from 32 bytes. Because of the resulting loss of information which would be transmitted in a single message of this reduced length, this was an unacceptable result.

The present invention is directed at a solution to this and similar problems. As described herein, use of the invention enables the previous 32 byte message length to be retained, even though the current is at the higher level required to increase inbound signal strength. Alternatively, message length of the inbound signal can be increased without increasing the signaling current level. It is also possible to increase both message length and signal current, to a certain extent, while maintaining temperature within a meter within safe limits. The present invention is applicable to all of the above possible scenarios.

BRIEF SUMMARY OF THE INVENTION

The present invention is directed to maintaining an enhanced burst rate capacity and signal strength of communication signals or messages produced by an AMR communications module by heat flow control for limiting the temperature rise of ambient air within the meter enclosure. The meter includes a communications module having at least one resistor or resistive element that produces heat when a current flows through it. Heat flow control is achieved by using/applying a phase change material, or PCM, to resistive elements installed in the module. The PCM can be applied in a number of different ways as described hereafter. As applied, the PCM quickly absorbs and stores the heat generated by resistors or resistive elements or other heat generating components such as silicon controlled rectifiers (SCRs) and the like. The PCM first absorbs and stores the heat, and then slowly releases it into the ambient air within the meter's enclosure. The rate at which the PCM absorbs and releases heat allows it to control the rate of temperature rise within the enclosure during a communication's period, and thereafter, enabling AMR communications to be at a message burst rate of 32 bytes, rather than some lower signal rate, and with a higher current level than would otherwise be possible so to increase signal strength.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

FIGS. 3a-3d illustrate different applications of a PCM for resistors or resistive elements in the AMR's communications module, the resistors or resistive elements having or not having associated heat sinks; and, FIGS. 4a and 4b are graphs illustrating the affect of using a PCM on the length of a message which can be generated by the AMR for communications with a utility.

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

The present invention is directed to enabling an enhanced burst rate capacity and signal strength for signals or messages M sent from an AMR module 10 to a utility U. A method of the invention uses heat flow control to manage (slow down) the temperature rise of ambient air within an enclosure 12 of the meter during communication cycles. In this regard, the invention is directed to control of the transfer of heat produced by a resistor or resistive element R to ambient air within enclosure 12, the heat flow control being achieved by application of a phase change material PCM. Once applied, the PCM quickly absorbs heat from resistor or resistive element R, stores the heat in the form of a "latent" heat within the material, then slowly releases the heat into the ambient air within the meter enclosure. By properly controlling the storage of heat and its subsequent release, the rate of the temperature rise within the enclosure is so controlled that electrical components within AMR module 10 do not operate outside their acceptable range of temperatures. This allows a TWACS system 20 which communicates with the AMR to transmit and receive outbound and inbound signals at a burst rate of 32 bytes, rather than at some lower rate which would otherwise have to be used with a resulting loss in the amount of information or data communicated from the AMR module to the utility in a message.

Figure 1:
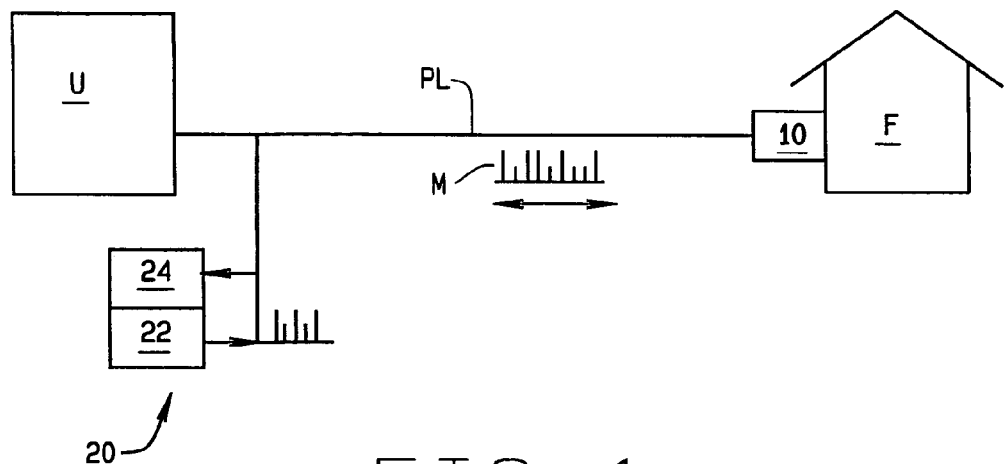
FIG. 1 is a simplified representation of a power distribution system including an AMR with a TWACS communication capability.

Referring to FIG. 1, AMR module 10 is located at an electricity using facility F with power from an energy source, utility U, being transmitted to the facility over a power line PL. TWACS 20 includes a transmitter 22 which generates a signal (referred to as an "outbound" signal) and impresses it on the power line PL so it is sent to and received by AMR module 10. As noted, the signal requests the AMR to provide certain information about electricity use at the facility F for use by the utility U. In response to the outbound signal or query, AMR module 10 produces a reply signal (referred to as an "inbound signal") and impresses it on the power line PL so it is transmitted to a TWACS receiver 24.

Figure 2:
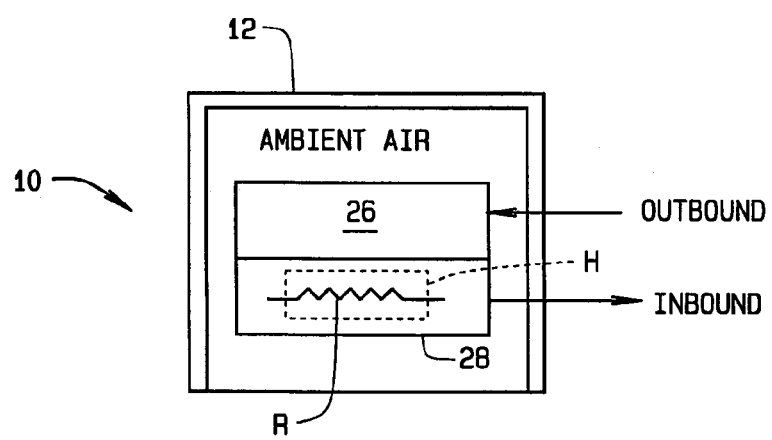
FIG. 2 is a simplified representation of a prior art AMR having a communications module.

FIG. 2 is a simplified representation of AMR module 10. The AMR module includes a signal receiver module 26 which receives and processes the outbound signal from the TWACS, and a signal generating module 28 which generates the response or inbound signal to the TWACS. These, and other components of the AMR are housed within enclosure 12. When the module 28 generates an inbound signal in response to a query from the TWACS, high current pulses (up to 21 amps) are generated and flow through a fixed value resistor or resistive element R which comprises part of the signal generating module. Resistive element R can be one of a number of different types of elements including, but not limited to, a wire wound resistor hard wired to a printed circuit board (PCB) or the like, a flexible resistive element made by suitably processing flexible copper clad laminated sheets, or a single or multiple layer of deposit of a resistive material on a substrate. The resistive element may, or may not, have an associated heat sink H. It is axiomatic that when a current passes through a resistor, electrical energy is converted into heat. In the enclosed confines of AMR module 10, this heat, when released to the surroundings inside the meter enclosure, significantly increases not only the temperature of the ambient air within enclosure 12, but that of the electronics within AMR module 10 as well.

As is known in the art, electronic components typically function best when operating within a preferred range of temperatures. If the operating temperature exceeds these limits, the components' performance begins to be significantly degraded. If a component's temperature gets too hot, the component can fail. When there is sufficient air circulation within a compartment in which a component is housed, heat produced by the component's operation or the current impressed on the component, is readily drawn off and the component continues to operate within its preferred temperature range. However, in an enclosed environment such as that within AMR module 10, where there is little or no circulation, excessive heating can be a significant problem. As previously discussed, AMR module 10 is now designed for 21 amp current operating in producing an inbound TWACS signal, and the message is sent as a 32 byte burst impressed on a 240V. circuit including power line PL. As previously discussed unless the temperature rise within AMER module 10 can be sufficiently controlled so to accommodate the 21_amp current, the signal burst rate will have significantly reduced (i.e., almost halved) to prevent overheating.

Referring to FIGS. 3a-3d a heat flow control means 30 of the present invention employs a phase change material or PCM applied to the resistive elements within the AMR's communications module. The PCM performs three functions in controlling the rise in temperature of ambient air within enclosure 12. First, the PCM quickly absorbs the heat produced by a resistive element R when a current is impressed on the element. Next, the PCM stores the heat at a lower and relatively constant temperature while experiencing a phase change from solid to liquid. Finally, the softened PCM slowly releases the stored heat into the ambient air within the enclosure as it returns back to its solid phase.

The PCM is a solid material which, when heated, experiences a temperature increase from its normal (ambient) temperature to a phase change temperature. When the phase change temperature is reached, the material changes phase from solid to liquid, which is occurring at a constant temperature. When the PCM converts from its solid to its liquid phase, it absorbs a large amount of heat previously referred to as latent heat. This energy absorption allows all of the solid mass of the PCM to completely convert to a liquid at the constant temperature. After the transformation, the PCM is a soft, semi-molten, non-dripping material. Thereafter, the temperature of the liquid PCM begins to rise as more heat is transferred to the material. Those skilled in the art will appreciate that, as a practical matter, the amount of PCM used is such that substantially all of the heat produced by current flow through the resistive elements of module 28 is used to affect the phase transformation at the relatively lower phase change temperature, rather than being released into enclosure 12 and increasing the temperature within the enclosure. Further, it will be ensured during the design that the solid PCM does not completely turn in to liquid, but only softens to a semi-molten and non-dripping state.

The conversion process is a reversible process. Accordingly, when no more heat is being transferred to the material from its surroundings, the temperature of the material will begin to fall, the PCM now transfers some heat back into its surroundings, and the PCM changes state back to solid. This second phase change also takes place at a constant temperature. Importantly, while some heat is now released into the ambient air within enclosure 12, this occurs when little or no current is flowing through the resistive elements; so the ambient air temperature remains below the critical temperature Tmax at which performance of components within the AMR begins to be affected.

Referring to the graphs of FIGS. 4a and 4b, without communications back and forth between AMR module 10 and the utility, there is still an ambient air temperature within enclosure 12. Now, when an outbound communication is received from TWACS 20, and an inbound signal is produced, the generated heat causes the ambient air temperature to rise. It is important operation of the AMR that the air temperature not exceed the maximum temperature Tmax, or otherwise the performance of the electronic components within the unit will begin to degrade. One way to control this is by the spacing between messages sent to the AMR. Another is to have the AMR generate and transmit messages M which are relatively short and have a relatively low signal strength. The amount of information which can be communicated this way, and the ability to receive all of a transmission, is not conducive to the level of performance now required in a distribution system employing AMRs.

The improvement of the invention, as shown in FIGS. 4a and 4b are that, with reference to FIG. 4a, using the PCM allows a message of length Mn to be significantly longer than a message Mc that otherwise would have to be used. In FIG. 4a, the difference in message length ?M is 14 bytes, meaning that message Mn can be almost twice as long as it would otherwise have to be. In FIG. 4b, use of the PCM means that the temperature rise from ambient air temperature to the Tmax level, is significantly slower than without use of the material. As indicated in FIG. 4b, without use of the material, a message M1 produces a rapid increase in ambient air temperature; whereas with use of the material, a message M2 of the same length results in a much slower temperature increase.

As shown in FIGS. 3a and 3b, for a resistive element R without an associated heat sink, the PCM is applied either in a single layer L, or in multiple layers L1-Ln. A single layer is applied by spraying or painting the PCM over the surface of the element (FIG. 3a). If there are multiple layers, sheets of the PCM are applied over the element (FIG. 3b). It will be understood by those skilled in the art that where multiple layers of the material are applied, different sheets of the PCM may have different PCM properties, and that sheets of the PCM can be interleaved with sheets not having PCM properties.

In some instances, the resistive element has an associated heat sink H. This is as shown in FIGS. 3c and 3d. Again, the PCM is applied either in a single layer L, or in multiple layers L1-Ln. The single layer is applied by spraying or painting the PCM over a surface of the heat sink (FIG. 3c); while, if there are multiple layers, sheets of the PCM are applied over the heat sink (FIG. 3d). Again, where multiple layers of the material are applied, different sheets of the PCM may have different PCM properties, and sheets of the PCM can be interleaved with sheets not having PCM properties. The PCM can also be applied by filling a specially designed groove or cavity (not shown) on an outer side of the heat sink, or by filling a hole or cavity created in the body of the heat sink. It is also possible to fabricate a heat sink H exclusively of PCM.

During a communication's cycle (receipt of outbound signal, transmission of inbound signal), the PCM performs its heat flow control by first absorbing the heat produced by current flow through a resistive element. As discussed, the material is initially in a solid state and as the material heats up and changes from a solid to a liquid phase it becomes soft and rubbery. Again, because the PCM absorbs and stores heat, the phase change occurs at a practically constant temperature. Since the result is that the PCM limits the temperature rise within enclosure 12 until the mass of PCM is converted to a liquid, the increase in ambient air temperature is significantly less than it otherwise would be. Those skilled in the art will understand that the amount of PCM employed is a function of the length of the longest inbound message AMR module 10 produces. This then results in most of the heat energy being stored in the material so the increase in air temperature within enclosure 12 remains relatively small.

After current flow ceases, the heat produced by the resistive element stops, and no further heat energy is transferred to the PCM. Now, the PCM begins to change in phase back to solid. As this phase change occurs, energy in the form of heat is given off by the PCM to the ambient air in the AMR. However, the phase transformation is not instantaneous, but occurs over a short period of time. Accordingly, there is not an instantaneous amount of energy dumped into the ambient air; rather, the energy is released over time. The heat energy released into the enclosure does cause the ambient air temperature to increase. At the same time this is occurring, however, heat previously released into the air within the enclosure is now being conducted through the sides of the enclosure, or absorbed by other components within the enclosure. This means that while there is a net increase of heat energy into the air, causing the air temperature to rise, since the release of this energy is now spread out over a period of time, the net amount of heat energy at any one time causing the air temperature to increase is always significantly less than it otherwise would be. The result is that the maximum ambient air temperature will always be less than Tmax.

Overall, the method of the invention, and heat flow control means 30 has a number of advantages. First, communications between AMR module 10 and utility U are at a higher byte rate than is otherwise possible, so each message can contain more information or data. Second, the signal strength of the bytes is sufficiently high that quality of a received inbound signal is not degraded. Third, the electronic components and any other temperature sensitive elements within the AMR are not damaged, performance degraded, or caused to fail by excessive temperatures produced as a result of the two-way communications.

Finally, it will be appreciated that the PCM can be used in other environments where temperature sensitive components are used and where the temperature of the environment surrounding the components must be controlled so their performance is not affected.

In view of the above, it will be seen that the several objects and advantages of the present invention have been achieved and other advantageous results have been obtained.

Having thus described the invention, what is claimed and desired to be secured by Letters Patent is:

1. In a monitoring system having an automatic meter reader (AMR) used in an electrical distribution system, the AMR including a communications module housed within an AMR enclosure for two-way communications between a utility and the AMR to report information to the utility concerning electricity usage at the site where the AMR is installed, and the communications module including at least one resistive element to which a current is supplied during the communications, the monitoring system comprising:

a receiver module for receiving an outbound signal from the utility;

a signal transmission module for generating an inbound signal to the utility in response to the outbound signal, the inbound signal having current pulses up to and including 21 amps and having a burst rate up to and including 32 bytes, the signal transmission module configured to communicate the inbound signal through the restive element; and a phase change material (PCM) applied to the resistive element, the PCM quickly absorbing heat from the resistive element, storing heat within the PCM, and then slowly releasing the heat into the ambient air within the enclosure to control the operating temperature of the resistive element when the resistive element acts as a heat source due to current flow through the element, thereby to control the temperature rise of ambient air inside the AMR enclosure during two-way communications.

2. The improvement of claim 1 in which the PCM comprises a chemical compound sprayed onto the resistive element.

3. The improvement of claim 2 in which the properties of the PCM are a function of the thickness of the layer of material sprayed over the resistive element.

4. The improvement of claim 1 in which the PCM comprises a chemical compound painted onto the resistive element.

5. The improvement of claim 4 in which the properties of the PCM are a function of the thickness of the layer of material painted onto the resistive element.

6. The improvement of claim 1 in which the PCM is applied as a single sheet of PCM positioned over the resistive element.

7. The improvement of claim 6 in which the PCM is applied as a multiple sheets of PCM positioned over the resistive element.

8. The improvement of claim 7 in which different sheets of the PCM have different PCM properties.

9. The improvement of claim 7 in which sheets of the PCM are interleaved with sheets not having PCM properties.

10. The method of claim 1 in which the PCM is applied as a single sheet of PCM positioned over the resistive element.

11. The method of claim 10 including applying the PCM as multiple sheets of PCM over the resistive element.

12. The method of claim 11 in which different sheets of the POM have different PCM properties.

13. The improvement of claim 11 in which sheets of the PCM are interleaved with sheets not having PCM properties.

14. The improvement of claim 1 in which the resistive element has an associated heat sink and the PCM is applied to the heat sink.

15. The improvement of claim 14 in which the PCM comprises a shaped insert fitted about the heat sink.

16. The improvement of claim 15 in which the PCM is comprises a filler material fitted about the heat sink.

17. The improvement of claim 15 in which a heat sink is fabricated exclusively from the PCM.

18. The method of claim 17 in which heat sink is fabricated exclusively from PCM.

19. In an electrical distribution system, a method of enhancing the burst rate capacity of a signal supplied between a utility and an automatic meter reader (AMR) installed at a using facility in the system, the AMR including a communications module housed within an AMR enclosure for two-way communications with the utility to report information to the utility concerning electricity usage at the site where the AMR is installed, the communications module including at least one resistive element to which a current is supplied during the communications, the method comprising:

generating and communicating an outbound guery signal to the AMR;

receiving the outbound guery signal;

generating an inbound signal in response to the outbound guery signal having current pulses up to and including 21 amps;

communicating the inbound signal at a burst rate up to and including 32 bytes through the restive element; and applying a phase change material (PCM) about the resistive element to control the operating temperature of the resistive element when the resistive element acts as a heat source due to current flow through the element during communications, the (PCM) quickly absorbing heat from the resistive element, storing the heat within the PCM, and then slowly releasing the heat into the ambient air within the enclosure to control the temperature rise of ambient air inside the AMR enclosure during the communications to maintain the ambient air temperature within the enclosure within a temperature range conducive for proper function of components within the communications module whereby the communications module can process a the inbound signal having the bytes impressed for the two-way communications between the utility and the AMR.

20. The method of claim 19 in which applying the PCM to the resistive element slows down the temperature rise of ambient air inside the meter enclosure further serves to increase the signal strength of a communications signal.

21. The method of claim 20 including spraying the PCM onto the resistive element.

22. The method of claim 21 in which the properties of the PCM are a function of the thickness of the layer of material sprayed over the resistive element.

23. The method of claim 20 including spraying the PCM onto the resistive element.

24. The method of claim 23 in which the properties of the PCM are a function of the thickness of the layer of material painted onto the resistive element.

* * * * *